No. 681,502. Patented Aug. 27, 1901.
JESSE & JACOB HEYNE.
STEAM BAKE PAN.
(Application filed Dec. 27, 1900.)
(No Model.)
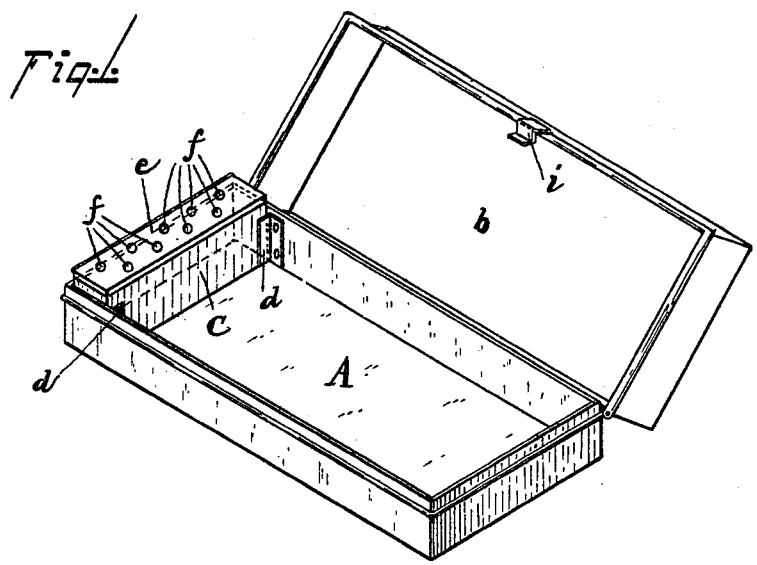
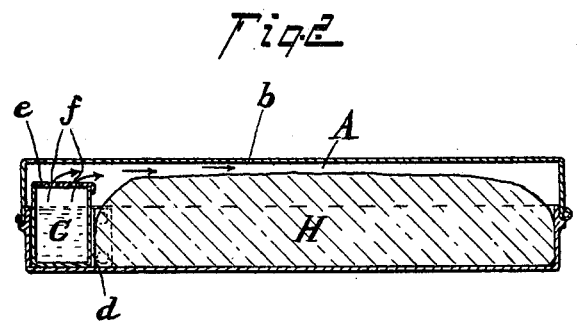
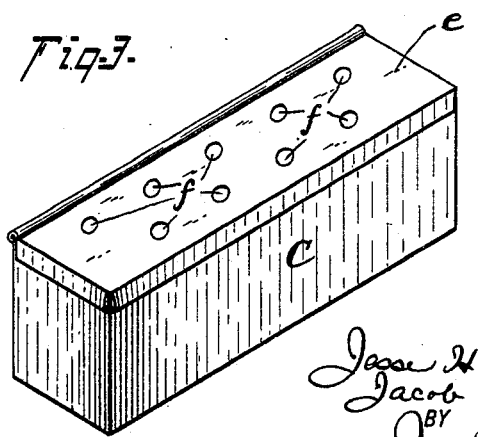
WITNESSES:
Walter C. Pusey
John F. Nolan
INVENTORS:—
Jesse Heyne,
Jacob Heyne,
BY
Joshua Pusey
ATTORNEY.

United States Patent Office.

JESSE HEYNE AND JACOB HEYNE, OF PHILADELPHIA, PENNSYLVANIA.

STEAM BAKE-PAN.

SPECIFICATION forming part of Letters Patent No. 681,502, dated August 27, 1901.

Application filed December 27, 1900. Serial No. 41,209. (No model.)

*To all whom it may concern:*

Be it known that we, JESSE HEYNE and JACOB HEYNE, citizens of the United States, residing at the city and county of Philadelphia, in the State of Pennsylvania, have invented certain new and useful Improvements in Steam Bake-Pans, of which the following is a full, clear, and exact description, reference being had to the accompanying drawings, of which—

Figure 1 is a perspective view, the lid of the pan being open. Fig. 2 is a longitudinal vertical section of the device, the lid of the pan being closed and a loaf of bread therein. Fig. 3 is an enlarged perspective view of the water-containing vessel removed.

Our invention relates to improvements in pans in which steamed bread, cake, &c., may be baked.

What is known as "steamed" bread is at present produced by bakers having what are known as "steam-ovens," which are quite expensive and not adapted for use of housekeepers in the ordinary kitchen-range, nor are small bakers able to produce such steamed bread, owing to the expense of installing suitable steam-ovens.

Our object has been to provide a pan in which a loaf or loaves may be readily steam-baked in the ordinary range-oven.

To this end our invention consists of a pan having a lid or cover, and in one end or along one side of the pan is placed a vessel or tank containing water, the top of said vessel being adjacent to but below the under side of the lid of the pan and said top having openings or perforations therethrough for the escape of steam into the pan.

The invention also consists in certain details of construction hereinafter pointed out.

In the accompanying drawings, A is a pan, in this case made of sheet metal, having a lid or cover $b$ hinged to its rear side, as seen, and adapted to tightly close the pan when shut. In one end of the pan is a vessel or tank C, which is preferably removable, being held in place in the end of the pan by vertical guides $d$, projecting from the sides of the latter. The vessel C is provided with a lid or cover $e$, which is perforated at $f$, as seen, and when the said vessel is in place in the pan the lid $e$ thereof will be somewhat below the under side of the cover $b$ of the pan, thus affording a space or passage-way for steam between said lid $e$ and cover $b$.

The manner of using our device is as follows: The vessel or tank C is partially filled with water (or it may be a suitable flavoring liquid) and is inserted in the end of the pan, being held in position by the guides $d$. A lump of dough H to form the loaf is placed in the pan and the cover $b$ is tightly shut and secured by means of a catch $i$. The pan is now placed in an oven, and as the heat evaporates the water in the vessel C the steam therefrom passes through perforations $f$ between the lid $d$ and cover $b$ and into the dough-holding portion of the pan and circulates therethrough, thoroughly steaming the bread as it is being baked, which is the object desired to be accomplished.

Our device may be quite easily and cheaply constructed, and when it is desired to bake bread therein in the ordinary manner—that is, not steamed—the vessel C may be emptied of water or removed and the pan used just as ordinary baking-pans.

Having thus described our invention, we claim as new and desire to secure by Letters Patent—

In a pan of the class described, the combination with the pan proper provided with a cover, of a water-receptacle arranged in the pan proper and having a cover provided with a series of perforations for exhausting the generated steam from said receptacle into the pan proper, and inwardly-extending vertically-disposed guides carried by the pan proper and embracing the water-receptacle to retain the latter against displacement in the pan proper.

In testimony whereof we have hereunto affixed our signatures this 13th day of November, A. D. 1900.

JESSE HEYNE.
JACOB HEYNE.

Witnesses:
WALTER C. PUSEY,
F. M. TULIN.